US007012999B2

(12) United States Patent
Ruckart

(10) Patent No.: US 7,012,999 B2
(45) Date of Patent: Mar. 14, 2006

(54) AUDIO CALLER IDENTIFICATION

(75) Inventor: John Ruckart, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 65 days.

(21) Appl. No.: 09/888,926

(22) Filed: Jun. 25, 2001

(65) Prior Publication Data
US 2002/0196914 A1 Dec. 26, 2002

(51) Int. Cl.
H04M 1/64 (2006.01)
(52) U.S. Cl. .............................. 379/88.21; 379/142.06; 455/415
(58) Field of Classification Search ............. 379/88.19, 379/88.2, 88.21, 88.26, 142.01, 142.08, 207.02, 379/215.01, 142.04, 142.06, 415
See application file for complete search history.

(56) References Cited

U.S. PATENT DOCUMENTS

| 5,121,423 A | 6/1992 | Morihiro et al. |
| D338,889 S | 8/1993 | Fuqua et al. |
| 5,263,084 A | 11/1993 | Chaput et al. |
| 5,265,145 A * | 11/1993 | Lim ........................ 379/88.2 |
| 5,274,699 A | 12/1993 | Ranz |
| 5,289,542 A | 2/1994 | Kessler |
| 5,315,650 A | 5/1994 | Smith et al. |
| 5,425,089 A | 6/1995 | Chan et al. |
| 5,430,719 A | 7/1995 | Weisser, Jr. |
| 5,452,346 A | 9/1995 | Miyamoto |
| 5,481,594 A | 1/1996 | Shen et al. |
| 5,511,111 A | 4/1996 | Serbetcioglu et al. ......... 379/67 |
| 5,530,741 A | 6/1996 | Rubin |
| 5,546,447 A | 8/1996 | Skarbo et al. |
| 5,550,905 A | 8/1996 | Silverman |
| 5,619,561 A | 4/1997 | Reese |
| 5,644,629 A | 7/1997 | Chow |
| D383,466 S | 9/1997 | Burrell et al. |
| 5,696,815 A | 12/1997 | Smyk |
| 5,734,706 A | 3/1998 | Windsor et al. |
| 5,754,635 A | 5/1998 | Kim |
| 5,771,281 A | 6/1998 | Batten, Jr. |
| 5,771,283 A | 6/1998 | Chang et al. |
| 5,781,621 A | 7/1998 | Lim et al. |
| 5,796,806 A * | 8/1998 | Birckbichler .............. 379/88.2 |
| 5,802,251 A | 9/1998 | Cohen et al. |
| 5,805,997 A | 9/1998 | Farris |
| 5,841,838 A | 11/1998 | Itoh et al. |
| 5,841,850 A | 11/1998 | Fan |
| 5,859,903 A | 1/1999 | Lee |

(Continued)

OTHER PUBLICATIONS

U.S. Appl. No. 09/888,832, filed Jun. 25, 2001, entitled "Visual Caller Identification".

(Continued)

Primary Examiner—Fan Tsang
Assistant Examiner—Gerald Gauthier
(74) Attorney, Agent, or Firm—Merchant & Gould

(57) ABSTRACT

An audio caller identification system and method are provided. A caller identification device of a called party's telephone, whether integrated with the telephone or stand-alone, includes a speaker for audibly alerting the called party to the nature of an incoming call. A speech synthesizer in concert with an audio caller ID program may audibly identify a name and/or number of the calling party displayed on the called party's caller ID device, including descriptive terms for calling parties such as "private," "unlisted," or "out of the area." When the called party's telephone begins to ring, the called party may listen to the audio identification of the calling party for a quick screening without having to go to the telephone to read the caller ID.

20 Claims, 3 Drawing Sheets

U.S. PATENT DOCUMENTS

| | | | | |
|---|---|---|---|---|
| 5,901,212 | A | 5/1999 | True et al. | |
| 5,903,636 | A | 5/1999 | Malik | |
| 5,905,794 | A | 5/1999 | Gunn et al. | |
| 5,915,000 | A | 6/1999 | Nguyen et al. | |
| 5,930,701 | A | 7/1999 | Skog | |
| 5,940,484 | A | 8/1999 | DeFazio et al. | |
| 5,946,636 | A | 8/1999 | Uyeno et al. | |
| D413,605 | S | 9/1999 | Thomas | |
| 5,949,865 | A | 9/1999 | Fusinato | |
| 5,953,399 | A | 9/1999 | Farris et al. | |
| 5,963,626 | A * | 10/1999 | Nabkel | 379/88.2 |
| 5,969,647 | A | 10/1999 | Mou et al. | |
| 5,970,127 | A | 10/1999 | Smith et al. | |
| 5,970,128 | A | 10/1999 | Kim | |
| 5,974,309 | A | 10/1999 | Foti | |
| 5,982,866 | A | 11/1999 | Kowalski | |
| 5,999,613 | A | 12/1999 | Nabkel et al. | 379/142.04 |
| 6,009,321 | A | 12/1999 | Wang et al. | |
| 6,021,188 | A | 2/2000 | Meg | |
| 6,031,899 | A * | 2/2000 | Wu | 379/88.26 |
| 6,044,148 | A | 3/2000 | Bleile | |
| 6,061,434 | A | 5/2000 | Corbett | |
| 6,065,844 | A | 5/2000 | Chen | 359/857 |
| 6,101,246 | A | 8/2000 | Heinmiller et al. | |
| 6,108,630 | A | 8/2000 | Kuechler et al. | |
| 6,111,939 | A | 8/2000 | Brabanec | |
| 6,137,871 | A | 10/2000 | Maier et al. | |
| 6,154,531 | A | 11/2000 | Clapper | |
| 6,160,876 | A | 12/2000 | Moss et al. | |
| 6,163,691 | A | 12/2000 | Buettner et al. | |
| 6,173,049 | B1 | 1/2001 | Malik | |
| 6,178,232 | B1 | 1/2001 | Latter et al. | |
| D437,879 | S | 2/2001 | Weinandt | |
| 6,219,407 | B1 | 4/2001 | Kanevsky et al. | |
| 6,243,448 | B1 | 6/2001 | Corbett et al. | |
| 6,243,461 | B1 | 6/2001 | Hwang | |
| 6,266,399 | B1 | 7/2001 | Weller et al. | |
| 6,282,275 | B1 | 8/2001 | Gurbani et al. | |
| 6,292,479 | B1 | 9/2001 | Bartholomew et al. | |
| 6,292,549 | B1 | 9/2001 | Lung et al. | |
| 6,304,644 | B1 | 10/2001 | Karnowski | |
| 6,310,943 | B1 | 10/2001 | Kowalski | |
| 6,311,057 | B1 | 10/2001 | Barvesten | |
| 6,317,488 | B1 | 11/2001 | DePond et al. | |
| 6,324,271 | B1 | 11/2001 | Sawyer et al. | |
| 6,327,347 | B1 * | 12/2001 | Gutzmann | 379/88.2 |
| 6,332,021 | B1 * | 12/2001 | Latter et al. | 379/142.01 |
| 6,339,639 | B1 | 1/2002 | Henderson | |
| 6,341,161 | B1 | 1/2002 | Latter et al. | |
| 6,345,187 | B1 | 2/2002 | Berthoud et al. | |
| 6,347,136 | B1 * | 2/2002 | Horan | 379/88.2 |
| 6,351,637 | B1 | 2/2002 | Lee | |
| 6,366,772 | B1 | 4/2002 | Arnson | |
| 6,389,124 | B1 | 5/2002 | Schnarel et al. | |
| 6,400,809 | B1 * | 6/2002 | Bossemeyer et al. | 379/88.21 |
| 6,400,947 | B1 | 6/2002 | Bright et al. | |
| 6,427,003 | B1 | 7/2002 | Corbett et al. | |
| 6,442,262 | B1 | 8/2002 | Moss et al. | |
| 6,445,781 | B1 | 9/2002 | Heinmiller et al. | |
| 6,449,351 | B1 | 9/2002 | Moss et al. | |
| 6,480,589 | B1 | 11/2002 | Lee et al. | |
| 6,493,439 | B1 | 12/2002 | Lung et al. | |
| 6,496,569 | B1 | 12/2002 | Pelletier et al. | |
| 6,496,571 | B1 | 12/2002 | Wilson | |
| 6,498,841 | B1 * | 12/2002 | Bull et al. | 379/142.08 |
| 6,529,591 | B1 | 3/2003 | Dosani et al. | |
| 6,542,583 | B1 | 4/2003 | Taylor | |
| 6,542,591 | B1 | 4/2003 | Amro et al. | |
| 6,546,092 | B1 | 4/2003 | Corbett et al. | |
| 6,553,110 | B1 | 4/2003 | Peng | |
| 6,553,221 | B1 | 4/2003 | Nakamura et al. | |
| 6,560,317 | B1 | 5/2003 | Quagliana | |
| 6,570,971 | B1 | 5/2003 | Latter et al. | |
| 6,574,319 | B1 | 6/2003 | Latter et al. | |
| 6,608,891 | B1 * | 8/2003 | Pelletier et al. | 379/207.02 |
| 6,631,181 | B1 | 10/2003 | Bates et al. | |
| 6,639,979 | B1 | 10/2003 | Kim | |
| 6,650,743 | B1 | 11/2003 | Heinmiller et al. | |
| 6,718,021 | B1 | 4/2004 | Crockett et al. | |
| 6,728,355 | B1 | 4/2004 | Kowalski | |
| 6,731,727 | B1 | 5/2004 | Corbett et al. | |
| 6,748,058 | B1 | 6/2004 | Schwend et al. | |
| 6,748,068 | B1 | 6/2004 | Walsh et al. | |
| 6,766,003 | B1 | 7/2004 | Moss et al. | |
| D494,953 | S | 8/2004 | Leung | |
| 6,771,754 | B1 | 8/2004 | Pelletier et al. | |
| 6,771,755 | B1 | 8/2004 | Simpson | |
| 6,785,301 | B1 | 8/2004 | Chapman et al. | |
| 6,785,368 | B1 | 8/2004 | Eason et al. | |
| 6,807,267 | B1 | 10/2004 | Moss et al. | |
| 6,810,115 | B1 | 10/2004 | Fukuda | |
| 6,816,481 | B1 | 11/2004 | Adams et al. | |
| 6,826,271 | B1 | 11/2004 | Kanabar et al. | |
| 6,831,974 | B1 | 12/2004 | Watson et al. | |
| 6,845,151 | B1 | 1/2005 | Peng | |
| 2002/0009184 | A1 | 1/2002 | Shnier | 379/142.01 |
| 2002/0125929 | A1 | 9/2002 | Pope | |
| 2002/0183098 | A1 | 12/2002 | Lee et al. | 455/566 |
| 2002/0191755 | A1 | 12/2002 | Lew et al. | 379/88.19 |
| 2003/0092384 | A1 | 5/2003 | Ross, III | 455/41 |
| 2003/0095650 | A1 | 5/2003 | Mize | 379/88.19 |

OTHER PUBLICATIONS

Miae, Gary. Patent Pend. Projected Caller ID Own 50% Look [online], Sep. 10, 2000 [retrieved on Sep. 20, 2000].

* cited by examiner

AUDIO CALLER IDENTIFICATION

TECHNICAL FIELD

This invention generally relates to telephony-based caller identification systems and methods, and more particularly, relates to a system and method for providing audio caller identification.

BACKGROUND OF THE INVENTION

In recent years a growing number of telephone services have become available to users of telephone services. Such services include, for example, call forwarding, call waiting, conferencing, and caller identification.

Caller identification, or Caller ID, has become particularly popular as it allows called parties a certain degree of call screening prior to answering a call. In a typical case, the called party's telephone has a caller ID screen or a stand-alone attached caller ID device. When the called party receives a call, caller identification information on the calling party, including the date and time of the call, and often the name and number of the calling party, is displayed on the screen of the called party's caller ID device.

Typically, the called party receives the call, and the called party must rush to the telephone to determine who is calling by reading the caller ID screen on the called party's caller ID device. Most often, one of three caller identifications is provided to the called party. One, the identification is a name and/or number known to the caller, for example, a friend, family member, or associate. Two, the identification is a name and/or number unknown to the called party, or three, no name or number is provided, and the screen reads "private," "unlisted," "out of area," or the like. For called parties who are seeing impaired, the problem is greater because they are unable to read the caller ID information from a standard caller ID equipped telephone or standalone caller ID device.

It is with respect to these considerations and others that the present invention has been made.

SUMMARY OF THE INVENTION

In accordance with the present invention, the above and other problems are solved by an audio caller identification system and method. A caller identification device of a called party's telephone, whether integrated with the telephone or stand-alone, includes a speaker for audibly alerting the called party to the nature of an incoming call. A speech synthesizer in concert with an audio caller ID program may audibly identify a name and/or number of the calling party displayed on the called party's caller ID device, including descriptive terms for calling parties such as "private," "unlisted," or "out of the area." When the telephone begins to ring, the called party may listen to the audio identification of the calling party for a quick screening without having to go to the telephone to read the caller ID.

According to another aspect of the invention, the called party may save into memory a number of pre-recorded messages associated with known telephone numbers. When the called party's telephone rings, a comparison is performed of the calling party number with numbers associated with the stored pre-recorded messages. The comparison is performed by the caller identification device when it receives caller identification information on the calling party for display. If the telephone number of the calling party matches a number associated with one of the pre-recorded messages, the pre-recorded message is played to the called party along with a display of the caller identification information.

Alternatively, the audio message may be synthesized and presented to a called party by network software of a telephone network in which the called party's caller identification device operates. Likewise, pre-recorded messages and subsequent comparison of calling party numbers to numbers associated with pre-recorded messages may be performed by network software.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE INVENTION

Figure 1:
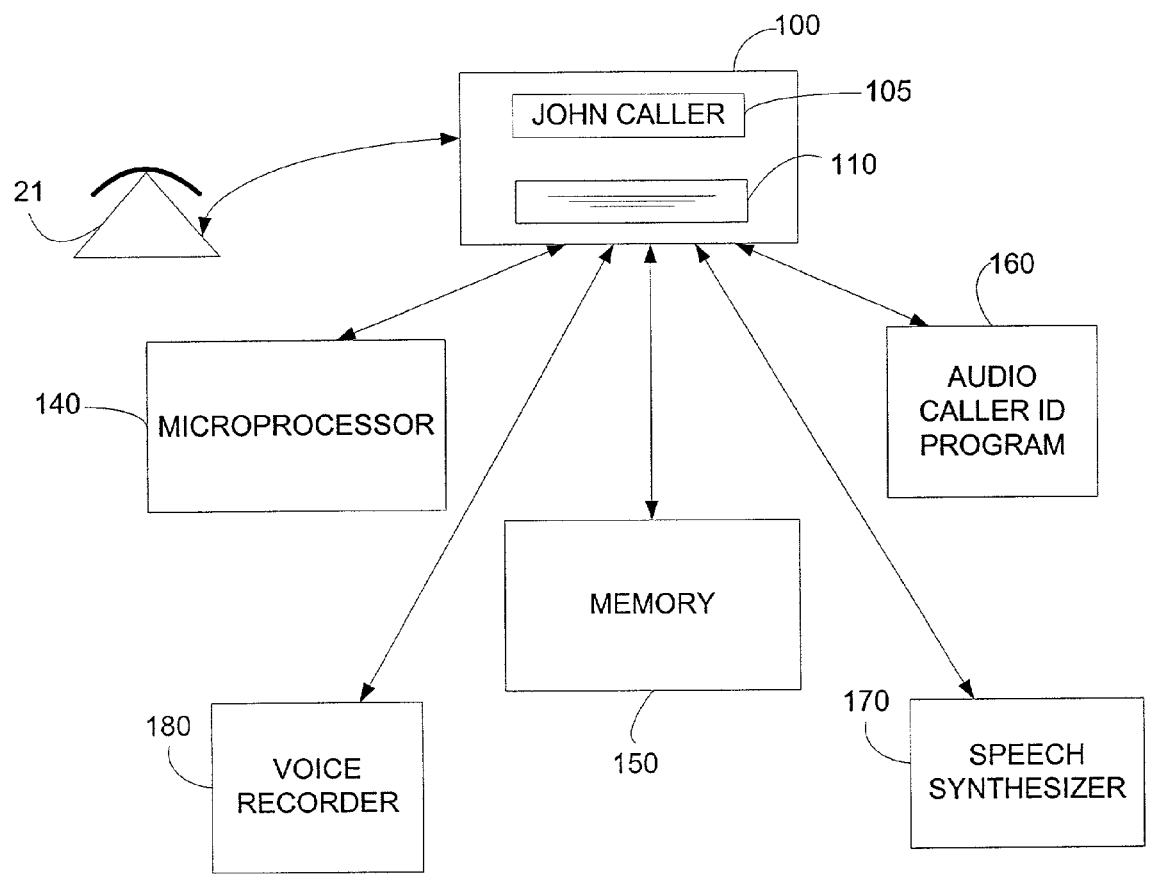
FIG. 1 is a block diagram illustrating the system architecture of an exemplary embodiment of the present invention.

In accordance with an exemplary embodiment of the present invention, an audio caller identification system and method are provided. The caller ID device, whether integrated with the telephone or stand-alone, includes a speaker for audibly alerting the called party to the nature of an incoming call. A speech synthesizer or pre-recorded message in concert with an audio caller ID program audibly identifies a name and/or number of the calling party displayed on the called party's caller ID device. The functionality of the present invention is particularly useful for seeing impaired parties who may use audio caller identification to alert them to the call and to provide them useful information as to the nature of the call. Referring now to the drawings, in which like numerals represent like elements throughout the several figures, aspects of the present invention will be described.

Caller ID is well known to those skilled in the art as a system and method for displaying to called parties information about a calling party. In the typical setting, a user of caller ID has a caller identification screen integrated with her telephone set or integrated into a caller ID box connected to a telephone set as a stand alone unit. Caller identification information may be transmitted to the called party for presentation on her caller ID device using a variety of known methods. One known method uses frequency shift keyed (FSK) modem tones. The FSK modem tones are used to transmit the display message in standard ASCII character code form, and typically the transmission of the display message takes place between the first and second ring of the user's telephone set. The information sent to the user most often includes the calling number and the date and time of the call. In some situations, the name of the calling party is also included.

FIG. 1 is a block diagram illustrating the system architecture of an exemplary embodiment of the present invention. As shown in FIG. 1, a telephone set 21 is provided, and connected to the telephone set 21 is a caller identification box 100. Alternatively, the caller identification functionality of the caller ID box 100 may be integrated with the telephone set 21. The caller ID box 100 includes a display screen 105 for display of caller identification information, such as the name, number, date, time, etc., for an incoming telephone call. According to a preferred embodiment, the caller ID box 100 includes a speaker 110 for audibly identifying incoming telephone calls as described above.

Also illustrated in FIG. 1 are a microprocessor 140, memory 150, an audio caller ID program 160, a speech synthesizer 170, and a voice recorder 180. According to an exemplary embodiment, the microprocessor 140 is resident in the caller ID box 100 for processing information coming into the caller ID box 100 as well as accepting and processing instructions contained in the audio caller ID program 160. The speech synthesizer 170 is a software module and hardware component for producing spoken words using well-known techniques such as splicing together pre-recorded words or by stringing together sounds that make up words. The voice recorder is a well-known recorder/player for recording and playing back on demand spoken words and sounds. According to one embodiment of the present invention, the user of the caller ID box 100 may enter into memory 150, through the telephone keypad of the telephone set 21 and through the voice recorder 180, a list of telephone numbers and associated pre-recorded messages for known parties, such as friends, family members, associates or anyone for whom the user would like to be notified of as a known caller by the audio caller identification system of the present invention.

When the user of the caller ID box 100 receives a call on her telephone set 21, the microprocessor 140 calls on the functionality of the audio caller ID program 160 to provide audio caller identification for the user as the called party. According to a preferred embodiment, the audio caller ID program 160 receives the caller identification information, such as the name and telephone number of the calling party. The audio caller ID program 160 calls on the functionality of the speech synthesizer 170 and the name of the calling party is passed to the speech synthesizer 170 for translation into spoken words. The caller identification information is displayed on the display screen 105. After a prescribed number of rings, the telephone ring is suspended and the speech synthesizer 170 via the audio caller ID program 160 and the microprocessor 140 provides an audio version of the name provided as part of the caller identification information. The number of rings provided before the audio caller ID information is provided may be set by the user/called party.

For example, if the caller identification information reads "John Caller," the speech synthesizer 170 will generate an audio version of the name, and the spoken words "John Caller" will be played through the speaker 110. If the caller identification information for the calling party is not available or is blocked, an audio message such as "private," "unlisted," or "out of the area" may be presented in audio form via the speaker 110. In short, any information displayed on the display 105 may be synthesized into audio form by the speech synthesizer 170, as programmed by the user. That is, the audio caller ID program 160 may be programmed to send a telephone number to the speech synthesizer when the name of the calling party is not identified.

Alternatively, the user of the caller ID box 100 may pre-record messages into memory 150 for play in association with known telephone numbers. The user may type into the keypad of the telephone set 21 numbers of known parties, for example, friends, family members, associates, etc., and then the user may record using the voice recorder 180 a message associated with a given number. For example, the user may type in the number of his associate, "John", and record a message such as "Pick up the phone—John is calling." According to this alternative embodiment, when caller identification information is sent to the called party, the audio caller ID program 160 queries the memory 150 for a pre-recorded message associated with the number. If a match is found the audio caller ID program 160 via the microprocessor 140 causes the voice recorder to play the pre-recorded message over the speaker 110. The caller identification information is displayed on the display screen 105, as described above. If no matching pre-recorded message is located in memory 150 for the telephone number of the calling party, the speech synthesizer 170 synthesizes the name or other identification provided with the caller identification information, as described above.

According to another embodiment, the functionality of both embodiments described above may be maintained and provided by network software and hardware, described below, and the audio caller identification may be provided by network elements to the called party at the called party's telephone 21.

Figure 2:
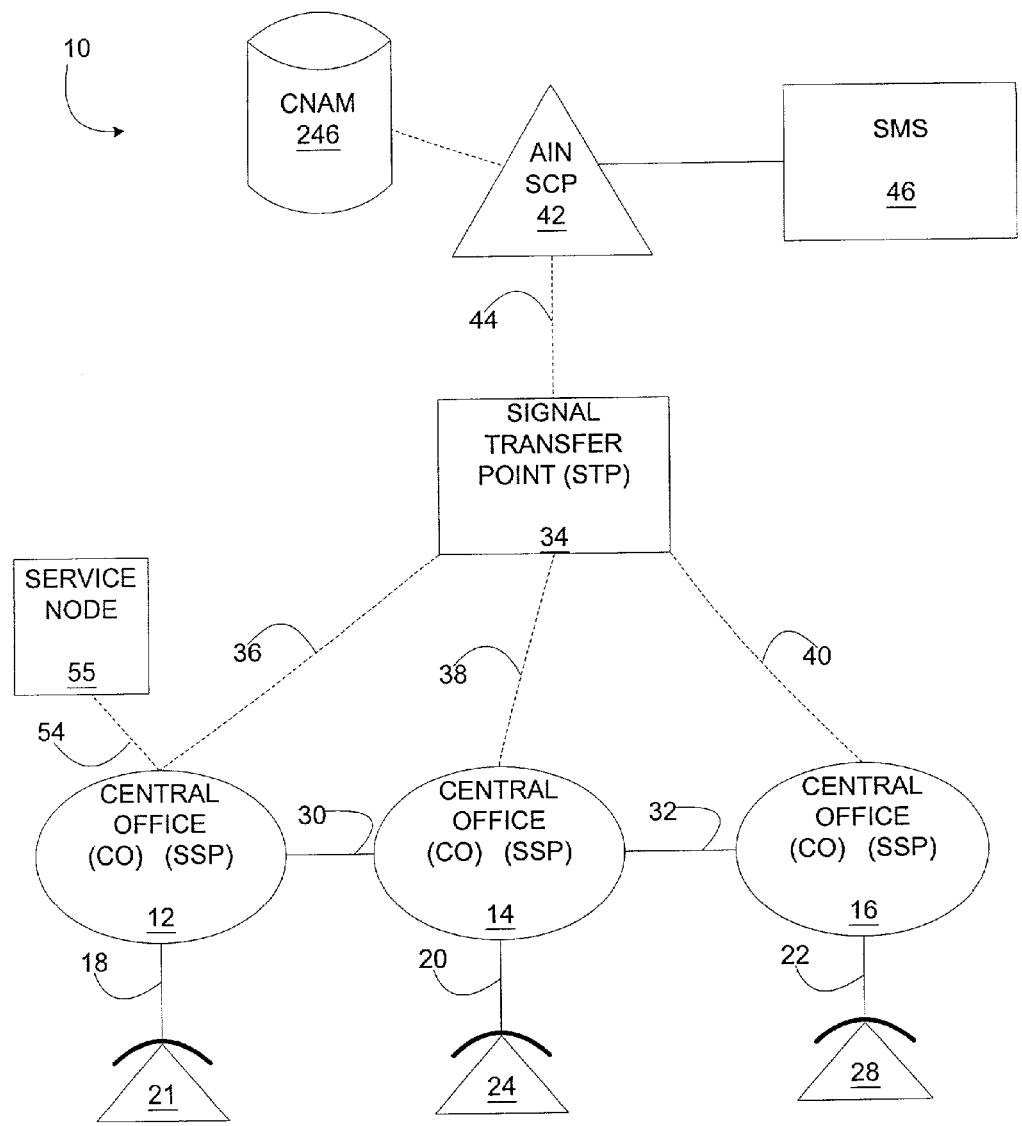
FIG. 2 illustrates a telephone network that provides an exemplary operating environment of the present invention.

FIG. 2 is a block diagram illustrating an exemplary operating environment for an embodiment of the present invention and includes a general description of a modem public switch telephone network through which the present invention preferably operates. The modem public switched telephone network (PSTN) has separate signaling paths for voice signals (or other customer-utilized communication circuits) and for control signals, which include information transmitted throughout the network to control the connection and disconnection of the voice circuits. In the late 1970s and early 1980s, American Telephone & Telegraph Company (AT&T) developed an early species of common channel interoffice signaling (CCIS). CCIS is essentially a network architecture for a switched telephone network in which information about a telephone call is transmitted over high speed data links that are separate from the voice circuits that are used to transmit the signals of the call itself.

The public switched telephone network that evolved in the 1980s incorporated the advanced intelligent network (AIN). Some of the components of the advanced intelligent network are illustrated in FIG. 2. FIG. 2 is a block diagram representing at least a part of the advanced intelligent network (AIN) 10 of a typical local exchange carrier. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 2, each central office may include an electronic switch known to those skilled in the art as a service switching point (SSP). These are indicated in FIG. 1 as SSP switches 12, 14, and 16.

The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 2, central offices switches (SSP) 12, 14, and 16 have a plurality of subscriber lines 18, 20, and 22 connected thereto. Each of the subscriber lines 18, 20, and 22 is connected to a terminating piece or pieces of customer premises equipment that are represented by pay telephone 21 and standard telephone sets 24 and 28. SSP switches 12, 14, and 16 are connected by a plurality of trunk circuits indicated as 30 and 32 in FIG. 2. These are the voice path trunks that interconnect the central offices 12, 14, and 16 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 2.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as AIN SCP 42, are physically implemented by relatively powerful fault tolerant computers. Among the functions performed by the service control points is maintenance of network databases used in providing enhanced services. The AIN SCP 42 is also connected to a caller ID with name (CNAM) database 246. The CNAM database comprises a plurality of directory numbers along with associated names for the directory numbers. The CNAM database may be used to provide a look-up database to provide caller ID service. According to an alternate embodiment of the present invention, caller identification information stored into memory 150 by the called party, may be stored in the AIN SCP 42 or in the CNAM database 246 or other AIN data storage device accessible by the SCP 42 for provision to the caller ID box 100 of the present invention.

The modern Advanced Intelligent Network 10 also includes service nodes (SN) such as service node 55 shown in FIG. 2. Those skilled in the art are familiar with service circuit nodes, which are physically implemented by the same types of computers that embody the SCP 42. In addition to the computing capability and data base maintenance features, service nodes 55 use ISDN lines and may include DTMF signal recognition devices, tone generation devices, voice synthesis devices and other voice or data resources. As shown in FIG. 2, the connection is through the SSP. For example SCN 55 is connected to SCP 42 via ISDN links 54 to SSP 12, ISDN/SS7 protocol conversion in SSP 12, and SS7 links 36 and 44. It is understood that the service node 55 may also be connected to a service management system, but such connection is not shown in FIG. 2. While service nodes 55 are physically quite similar to the SCP 42, there are some important differences in the uses to which they are put.

Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber. By contrast, service nodes, such as service node 55, are used principally when some custom feature or service is needed that requires an audio connection to the call or transfer of a significant amount of data to a subscriber over a switched connection during or following a call. As shown in FIG. 2, service circuit nodes 55 are typically connected to one or more (but normally only a few) SSP central office switches via Integrated Service Digital Network (ISDN) links shown as line 54. Thus, services that are implemented during a call (i.e., after completion of ringing or called subscriber pick up) employ the facility of a service node.

In operation, the intelligent network elements of the AIN 10, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12, 14, and 16, a relatively small set of triggers are defined at the SSP central office switches for each call.

The message created by an SSP 12 in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP 12 to route the held communication for connection with a terminating station. Query messages, conversation messages, and response messages are standard types of messages defined by the AIN protocol. The details of the AIN protocol are known to those skilled in the art and will not be further described herein. For more information regarding the AIN protocol, see Bellcore Specification GR-1298-CORE Switching Systems Generic Requirements for AIN 0.1, which is incorporated herein by reference.

Figure 3:
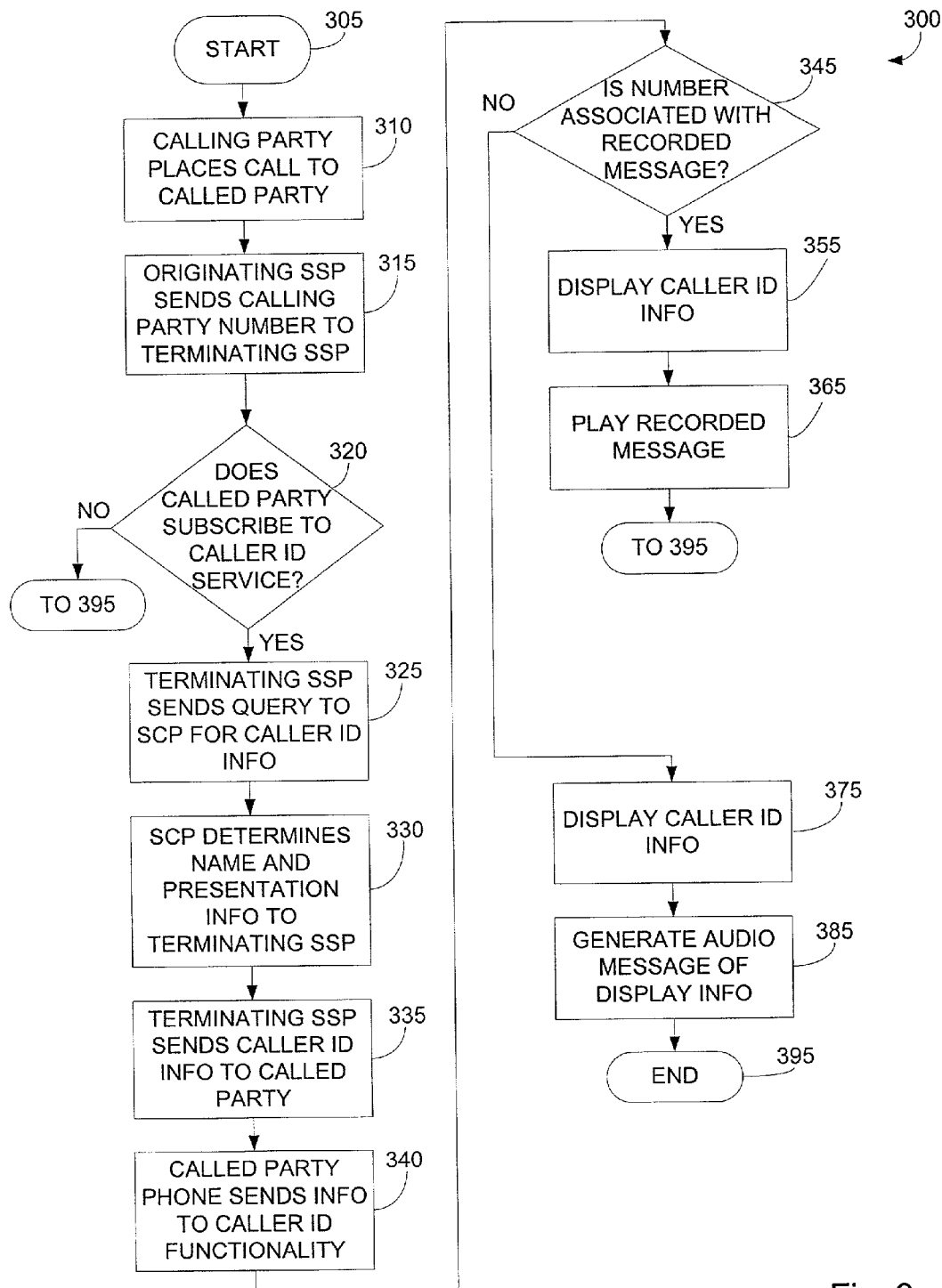
FIG. 3 illustrates an operational flow of the steps performed by the system and method of the present invention in providing audio caller identification.

Having described an exemplary operating environment above in reference to FIG. 2, a flow diagram illustrating a method 300 for providing audio caller identification service to a user of caller ID services in accordance with an embodiment of the present invention will be described with reference to FIGS. 1, 2 and 3. For purposes of the exemplary call flow, assume the called party has programmed into memory 150 telephone numbers of certain calling parties for whom the called party wishes to receive audio caller identification.

The method 300 begins at start step 305 and moves to step 310 where a calling party using a telephone set 24 places a call to a called party at telephone set 21, where the called party has subscribed to caller ID services. At step 315, the originating central office switch 14 attempts to set up a call between the telephone set 24 of the calling party and the telephone set 21 of the called party by signaling the terminating switch 12 of the called party.

At step 320, the terminating switch 12 receives the call set up message from the originating switch 14, and the terminating switch 12 sends a message to the AIN SCP 42 to determine call services, including caller ID, to which the called party has subscribed. If the called party at telephone set 21 has not subscribed to caller ID services, the method follows the "No" branch to step 395 and ends.

If the called party has subscribed to caller ID services, the method follows the "Yes" branch to step 325, and the terminating switch 12 sends a query to the SCP 42 for caller identification information, if any, associated with the telephone number of the calling party. At step 330, the SCP queries the CNAN database 246 for caller identification information, if any, associated with the telephone number of the calling party. As will be appreciated by those skilled in the art, the SCP may also query other SCP's or other databases to obtain caller identification information, if any, associated with the calling party. If the SCP 42 locates caller identification information associated with the telephone number of the calling party, the SCP 42 forwards the caller identification information to the terminating switch 12. If, however, the telephone number of the calling party is marked as private or unlisted, or if the SCP 42 is unable to locate caller identification information associated with the telephone number of the calling party, a message will be forwarded to the terminating switch 12 that the telephone number of the calling party is private, unlisted, or unavailable.

At step 335, the terminating central office switch 12 of the called party attempts to connect a call from the calling party by providing a ring at the telephone set 21. Along with the ring provision, the central office switch 12 provides the caller identification information to the telephone set 21, and at step 340, the caller identification information is sent to the caller ID box 100, illustrated in FIG. 1.

At step 345, the audio caller ID program 160, at the direction of a microprocessor 140, receives the caller identification information and queries memory 150 to determine whether the telephone number of the calling party is associated with a message pre-recorded by the called party. If yes, the method follows the "YES" branch to step 355. At step 355, the microprocessor 140 displays the caller identification information sent to the caller ID box 100. At step 365, the pre-recorded message associated with the telephone number of the calling party is played to the called party by the voice recorder 180 via the speaker 110. According to an exemplary embodiment, the ringing of the telephone set 21 is suspended after a number of rings, prescribed by the called party, and the message is played. For example, if the telephone number of the calling party is associated with the called party's friend, John, the message may read "Pick up the phone—John is calling." After the message is played at step 365, the method ends at step 395.

If at step 345 the telephone number of the calling party does not match one of the pre-recorded messages, the method follows the "NO" branch to step 375, and the caller identification information for the calling party is displayed on the screen 105. At step 385, the name of the calling party or other identifier, such as "private," "unlisted," "out of the area," or the like, is sent to the speech synthesizer 170 for generation of an audio presentation of the name or other identifier to the user via the speaker 110. After the synthesized message is played to the called party via the speaker 110, the method ends at step 395. According to an alternative embodiment, the audio caller ID program 160 may be programmed to speech synthesize the telephone number of the calling party if that information is provided, but the name of the calling party is not available.

According to another embodiment, the pre-recorded messages may be recorded, stored and replayed over the speaker 105 from a network-based component, such as the service node (SN) 55, described above. In that case the SCP 42 may query a database of telephone numbers associated with pre-recorded messages recorded by the called party. The database of telephone numbers may be maintained at a number of network-based databases, including databases maintained at the SCP, SN, CNAM, etc. If a match is found at step 345, according to this embodiment, the pre-recorded message played at step 365 is played by the SN 55 to the called party via the switch 12. The SN 55 may also provide speech synthesis of caller identification information that is then provided to the called party via the switch 12.

According to another embodiment, the calling party may be permitted to record a message for play to the called party by the SN 55 if the called party permits the playing of messages from calling parties. For example, the calling party upon prompting may record the message, "Hi this is you Mom calling," and that message will be stored by the network for play to the called party by a network component, such as the SN 55. Then, after the SCP retrieves caller identification information for the calling party, as described above, the SCP 42 may direct the SN 55 to provide the recorded message of the calling party to the called party while caller identification information is sent to the called party's telephone 21 and caller ID box 100, as described above.

As described herein, a system and method are provided for presenting audio caller identification information to a called party to allow the called party to screen incoming telephone calls without the need for the called party to interrupt her activities in order to read the caller identification information provided on her caller identification device. It will be apparent to those skilled in the art that various modifications or variations can be made in the present invention without departing from the scope or spirit of the invention. Other embodiments of the invention will be apparent to those skilled in the art from consideration of the specification and practice of the invention disclosed herein.

I claim:

1. A method of providing audio caller identification in a network including a switch, a query module, an intelligent routing module and a database of caller identification information, wherein the method comprises:

receiving a call from a calling party at a calling party switch directed to a called party at a called party switch;

sending call information associated with the call to the query module, the call information including the directory number of the calling party;

at the query module, querying the database of caller identification information for caller identification information associated with the call, wherein the caller identification information comprises at least one of the directory number and a name associated with the calling party;

determining, at the intelligent routing module, if a recorded audio message is received from the calling party directed to the called party;

if a recorded audio message is received, then sending the recorded audio message from the calling party to a called party identification device via the called party switch; and causing the called party caller identification device to play the recorded audio message from the calling party and contemporaneously display the caller identification information associated with the call; and if no recorded audio message is received from the calling party directed to the called party, then determining if the directory number associated with the call matches the directory number associated with a pre-recorded audio message and if so, then sending the pre-recorded audio message to the called party identification device via the called party switch;

causing the called party identification device to play the pre-recorded audio message and contemporaneously display the caller identification information associated with the call;

if the directory number associated with the call does not match the directory number associated with the pre-recorded audio message, then causing the intelligent routing module to synthesize and send an audio message related to the caller identification information associated with the call to the called party identification device via the called party switch; and causing the called party caller identification device to play the audio message and contemporaneously display the caller identification information associated with the call.

2. The method of claim 1, wherein causing the called party identification device to play the recorded audio message and contemporaneously display the caller identification information associated with the call comprises causing the called party identification device to suspend ringing a telephone functionally connected to the called party identification device while playing the recorded audio message.

3. The method of claim 1, wherein the recorded audio message, the pre-recorded audio message, and the audio message are played over a speaker functionally connected to the called party identification device.

4. The method of claim 1, wherein the query module is a service control point in the advanced intelligent network.

5. The method of claim 1, wherein the intelligent routing module is a service node in the advanced intelligent network.

6. The method of claim 1, wherein causing the called party identification device to play the pre-recorded audio message and contemporaneously display the caller identification information associated with the call comprises causing the called party identification device to suspend ringing a telephone functionally connected to the called party identification device while playing the pre-recorded audio message.

7. The method of claim 1, wherein causing the called party identification device to play the audio message and contemporaneously display the caller identification information associated with the call comprises causing the called party identification device to suspend ringing a telephone functionally connected to the called party identification device while playing the pre-recorded audio message.

8. A system for providing audio caller identification, comprising:

a switch operative to receive a call from a calling party directed to a called party;

a query module operative to receive call information associated with the call from the switch, the call information including the directory number of the calling party, and to query a database of caller identification information for caller identification information associated with the call, wherein the caller identification information comprises at least one of the directory number and a name associated with the calling party; and an intelligent routing module operative:

to determine if a recorded audio message is received from the calling party directed to the called party;

if a recorded audio message is received, then send the recorded audio message from the calling party to a called party identification device via the switch;

cause the called party caller identification device to play the recorded audio message from the calling party and contemporaneously display the caller identification information associated with the call;

if no recorded audio message is received from the calling party directed to the called party, then determine if the directory number associated with the call matches the directory number associated with a pre-recorded audio message and if so, then send the pre-recorded audio message to the called party identification device via the switch;

cause the called party identification device to play the pre-recorded audio message and contemporaneously display the caller identification information associated with the call;

if the directory number associated with the call does not match the directory number associated with the pre-recorded audio message, then cause the intelligent routing module to synthesize and send an audio message related to the caller identification information associated with the call to the called party identification device via the called party switch; and cause the called party caller identification device to play the audio message and contemporaneously display the caller identification information associated with the call.

9. The system of claim 8, wherein causing the called party identification device to play the recorded audio message and contemporaneously display the caller identification information associated with the call comprises causing the called party identification device to suspend ringing a telephone functionally connected to the called party identification device while playing the recorded audio message.

10. The system of claim 8, wherein the recorded audio message, the pre-recorded audio message, and the audio message are played over a speaker functionally connected to the called party identification device.

11. The system of claim 8, wherein the query module is a service control point in an advanced intelligent network.

12. The system of claim 8, wherein the intelligent routing module is a service node in the advanced intelligent network.

13. The system of claim 8, wherein causing the called party identification device to play the pre-recorded audio message and contemporaneously display the caller identification information associated with the call comprises causing the called party identification device to suspend ringing a telephone functionally connected to the called party identification device while playing the pre-recorded audio message.

14. The system of claim 8, wherein causing the called party identification device to play the audio message and contemporaneously display the caller identification information associated with the call comprises causing the called party identification device to suspend ringing a telephone functionally connected to the called party identification device while playing the pre-recorded audio message.

15. A computer-readable medium having computer-executable instructions stored thereon which, when executed by a computer, will cause the computer to perform a method of providing audio caller identification in a network including a switch, a query module, an intelligent routing module and a database of caller identification information, wherein the method comprises:

receiving a call from a calling party at a calling party switch directed to a called party at a called party switch;

sending call information associated with the call to the query module, the call information including the directory number of the calling party;

querying the database of caller identification information for caller identification information associated with the call, wherein the caller identification information comprises at least one of the directory number and a name associated with the calling party;

determining if a recorded audio message is received from the calling party directed to the called party;

if a recorded audio message is received, then sending the recorded audio message from the calling party to a called party identification device via the called party switch; and causing the called party caller identification device to play the recorded audio message from the calling party and contemporaneously display the caller identification information associated with the call; and if no recorded audio message is received from the calling party directed to the called party, then determining if the directory number associated with the call matches the directory number associated with a pre-recorded audio message and if so, then sending the pre-recorded audio message to the called party identification device via the called party switch;

causing the called party identification device to play the pre-recorded audio message and contemporaneously display the caller identification information associated with the call;

if the directory number associated with the call does not match the directory number associated with the pre-recorded audio message, then causing the intelligent routing module to synthesize and send an audio message related to the caller identification information associated with the call to the called party identification device via the called party switch; and causing the called party caller identification device to play the audio message and contemporaneously display the caller identification information associated with the call.

16. The computer-readable medium of claim 15, wherein causing the called party identification device to play the recorded audio message and contemporaneously display the caller identification information associated with the call comprises causing the called party identification device to suspend ringing a telephone functionally connected to the called party identification device while playing the recorded audio message.

17. The computer-readable medium of claim 15, wherein the recorded audio message, the pre-recorded audio message, and the audio message are played over a speaker functionally connected to the called party identification device.

18. The computer-readable medium of claim 15, wherein the intelligent routing module is a service node in the advanced intelligent network.

19. The computer-readable medium of claim 15, wherein causing the called party identification device to play the pre-recorded audio message and contemporaneously display the caller identification information associated with the call comprises causing the called party identification device to suspend ringing a telephone functionally connected to the called party identification device while playing the pre-recorded audio message.

20. The computer-readable medium of claim 15, wherein causing the called party identification device to play the audio message and contemporaneously display the caller identification information associated with the call comprises causing the called party identification device to suspend ringing a telephone functionally connected to the called party identification device while playing the pre-recorded audio message.

\* \* \* \* \*